(12) United States Patent
Wehrly (10) Patent No.: US 8,973,960 B2
(45) Date of Patent: Mar. 10, 2015

(54) ROCK GRASPING AND REMOVAL APPARATUS

(75) Inventor: Daniel Wehrly, Bellflower, CA (US)

(73) Assignees: Kenda Wehrly, Gardena, CA (US); Donald George Wehrly, Jr., Gardena, CA (US)

( * ) Notice: Subject to any disclaimer, the term of this patent is extended or adjusted under 35 U.S.C. 154(b) by 677 days.

(21) Appl. No.: 13/245,057

(22) Filed: Sep. 26, 2011

(65) Prior Publication Data

US 2012/0207582 A1   Aug. 16, 2012

Related U.S. Application Data

(60) Provisional application No. 61/442,149, filed on Feb. 11, 2011.

(51) Int. Cl.
*B25J 15/02*       (2006.01)
*E02F 3/02*        (2006.01)

(52) U.S. Cl.
CPC . *B25J 15/024* (2013.01); *E02F 3/02* (2013.01)
USPC .......................................... 294/204; 294/198

(58) Field of Classification Search
CPC ........... B66C 1/422; B65G 7/12; A47J 45/10; Y10S 294/902; E21B 31/20
USPC .............. 294/16, 28, 62, 81.61, 87.22, 87.24, 294/86.14, 86.15, 106, 117–119, 198, 204
See application file for complete search history.

(56) References Cited

U.S. PATENT DOCUMENTS

| 3,139,302 | A | * | 6/1964 | Orloff et al. | 294/198 |
| 3,540,770 | A | * | 11/1970 | Mitchell | 294/111 |
| 5,163,727 | A | * | 11/1992 | Slezak et al. | 294/81.2 |
| 7,887,108 | B1 | * | 2/2011 | Cawley et al. | 294/2 |
| 8,287,015 | B2 | * | 10/2012 | Hawes | 294/86.4 |
| 2006/0202497 | A1 | * | 9/2006 | Cveykus | 294/118 |

* cited by examiner

*Primary Examiner* — Stephen Vu
(74) *Attorney, Agent, or Firm* — James M. Duncan, Esq.; Klein DeNatale Goldner (57) ABSTRACT

A manually deployed grasping apparatus may be utilized for retrieving objects, such as rocks, concrete chunks and other debris, from vertical excavations such as potholes, boreholes, drilled shafts, etc. Unlike backhoes and other articulated arm machinery, the disclosed grasping apparatus is manually lowered into the excavation by the user. Once the apparatus is adjacent to the object to be retrieved, the opposite facing jaw members of the apparatus are placed into an open position to receive the object. Once the object has been received by the opposite facing jaw members, the jaw members are closed to capture the object. The jaw members are then manually withdrawn from the vertical excavation to retrieve the object.

15 Claims, 8 Drawing Sheets

ROCK GRASPING AND REMOVAL APPARATUS

CROSS-REFERENCE TO RELATED APPLICATIONS

U.S. Provisional Application No. 61/442,149 for this invention was filed on Feb. 11, 2011 for which application this inventor claims domestic priority.

BACKGROUND OF THE INVENTION

This invention generally relates to vacuum excavation methods, and more particularly to devices which may be utilized for clearing rocks and other objects from the generally vertical excavation formed in the vacuum excavation process.

Air vacuum excavation, which is also known as potholing, is an excavation methodology which is utilized to expose utilities to ascertain the exact depth and location of the utilities, typically in preparation for more extensive excavation done in the process of construction activities. Because it is intended to cause a relatively small amount of disruption, air vacuum excavation generally utilizes a small diameter excavation to accomplish this purpose. The larger pieces of equipment utilized for the excavation, such as the vacuum truck, air compressor, etc., may be generally located to the side of the excavation, thereby allowing the survey to take place without major disruptions in surface operations occurring at the site, which is most commonly vehicle traffic along a roadway. Precisely locating underground utilities help the designers to plan construction projects to eliminate potential damage to the utilities and avoiding unnecessary relocations. Air vacuum excavation uses a combination of high-pressure air and a powerful vacuum to safely remove the soil above and around the utility eliminating the risk of damaging the utility which might otherwise occur utilizing traditional methods of mechanical excavation. After the pothole is completed and the utility data is collected then the excavation is backfilled.

So long as the material removed from the excavation during the potholing process is soil, the vacuum excavation process works very well. Because the material being removed is usually backfill, it would be expected that the material being removed would be compacted soil. However, it is not unknown for excavations to be filled with other materials, such as rocks, asphalt and concrete chunks, and other objects and materials.

If larger objects are encountered during the potholing process, major problems can arise. For example, if a large rock is encountered during the excavation, it is necessary to either remove the rock, or to change the location of the pothole. Under the known methods, the rock is typically eliminated by enlarging the excavation with a backhoe or other mechanical excavation machinery and either breaking up the rock with a jack hammer or chisel, or removing the rock. However, utilizing these methods eliminates the primary advantages of potholing, including that it is generally non-destructive and relatively inexpensive.

It is to be appreciated that the present invention may have utility in excavations created by methods other than vacuum excavation and used for purposes other than ascertaining the location of utilities. For example, drilled shafts (also called caissons, drilled piers or pile borings) may be used for bridges and structures where large loads and lateral resistance are major factors. There are a variety of tools utilized by construction contractors when constructing these types of excavations. However, regardless of the type of equipment used, hard rock and individual rock bodies and fragments are often encountered and often the excavation tool cannot advance until the rock is removed. Removal of the rock bodies and fragments can be a laborious and time consuming task to accomplish, particularly if specialized and/or expensive equipment is required to be brought on site for removal. In addition, the utilization of this equipment may require shutting down normal activities for mobilization and operation of the equipment, such as limiting or closing down traffic on a roadway. Accordingly, a need exists for a device which is capable of removing objects from a generally vertical excavation where the device is readily available, relatively compact, and relatively inexpensive.

SUMMARY OF THE INVENTION

The present invention, a grasping device for retrieving objects from generally vertical excavations, satisfies the need described above by providing a device that is convenient and easy to use, manually deployable, durable yet lightweight in design, versatile in its applications and allows anyone drilling or digging a hole to move rocks and rock fragments from a vertical excavation or potholing operation.

One embodiment of the device has a handle member comprising a length of tubing having a grasping surface which is manually grasped by the user as the grasping apparatus is lowered into the excavation. Depending from the handle member is a frame member. Attached to the lower end of the frame member is a pivot plate. A pair of opposite facing jaw members depend from the pivot plate. Each of the jaw members is pivotably attached to the pivot plate. A ram member, which may be pneumatically actuated, is operationally linked between at least one of the jaw members and the frame member. Operation of the ram by, for example, providing an air supply to cause the ram piston to retract into the cylinder, causes the opposite facing jaw members to open for receiving the rock or other object disposed within the vertical excavation. The ram may also be operated by releasing the air pressure such that air exhausts from the ram, which allows the jaw members to close around the object, allowing for its retrieval from the vertical excavation. Biasing means, such as helical torsion springs, may be utilized to maintain the jaw members in a closed position until opened by operation of the ram.

DETAILED DESCRIPTION OF THE INVENTION

Referring now to the figures, embodiments of the present invention will now be described more fully hereinafter. The invention may be embodied in different forms and should not be construed as limited to the embodiments set forth herein.

The present invention is a grasping apparatus which is utilized for retrieving objects from generally vertical excavations such as potholes, boreholes, drilled shafts, etc. Rather than requiring attachment to machinery, such as the articulating arm of a backhoe, the present invention is manually lowered into the excavation by the user. Manual deployment is often effective for potholes because the objects routinely encountered in excavations made in backfilled utility installations are relatively small in size, allowing a single person to manually lift an object out of the excavation. The manual deployment of the invention is one of the most attractive features of the invention, because it simplifies mobilization and utilization of the apparatus, and minimizes disruption of other activities at the worksite.

An embodiment of the grasping apparatus is depicted in FIGS. 1 through 8. As shown in the figures, an embodiment of the apparatus 10 has a first jaw member 12 and a second jaw member 14, each depending from and pivotably attached to a pivot plate 16. The first jaw member 12 and the second jaw member 14 are placed in opposite facing relation. A frame member 18 and pivot plate 16 are connected together. In the embodiment of the apparatus 10 depicted in the figures, the frame member 18 generally has a tee configuration, where a pair of pivot plates 16 are attached to the cross-member of the tee.

The figures show the first jaw member 12 and second jaw member 14 as each made up from parallel blade members 20, 22, with each blade member having a plurality of teeth members 24. The teeth members of the jaw members 12, 14 are in general facing relationship with the teeth members of the opposite facing jaw member. The teeth members 24 may either be integral components of the blade members 20, 22, or the teeth members may be separately attached to the blade members with fastening means known in the art. The blade members 20, 22 are attached together with cross-members 26. However, it is to be appreciated that the first jaw member 12 and second jaw member 14 may also be fabricated as solid units as opposed to the blade/cross-member construction utilized in the embodiments shown in the figures.

The top of the frame member 18 comprises a connector 28 for attaching a handle member 30 to the tool body, which comprises the jaw members 12, 14, frame member 18, and other functional components. The handle member 30 is generally one or more lengths of tubing which are manually grasped by a user as the apparatus 10 is lowered into and raised out of a vertical excavation 100. The handle member 30 comprises a grasping surface 32 along its length which passes through the user's hands. This grasping surface 32 may be knurled, textured, or have other means for improving the user's ability to maintain a grip on the handle member 30. The handle member 30 may have a length which may be adjusted by either connecting extensions to the handle member with conventional couplings, or utilizing a telescoping handle member 30. Thus the operational depth of the apparatus is not limited by the handle length.

The apparatus 10 will typically use one or more rams 34 for manipulating the jaw members 12, 14. The rams 34 comprise a piston 36 and a cylinder 38. The rams 34 are operationally linked between at least one of the jaw members 12, 14 and the frame member 18. One end of the ram may be attached to either one or both of the jaw members 12, 14, by connecting to an appropriate structure, such as attaching the piston 36 to cross-member 26 as shown, for example, in FIG. 2. The opposite end of the ram 34 is attached to the frame member 18 or to structures appurtenant to the frame member, such as extension members 48 as shown in the figures. It is to be appreciated that utilization of linkage systems not depicted in the figures may accomplish the same result of manipulating the jaw members 12, 14 to open and closed positions by utilizing two rams 34 as depicted in the figures, a single ram, or more than two rams.

Figure 1:
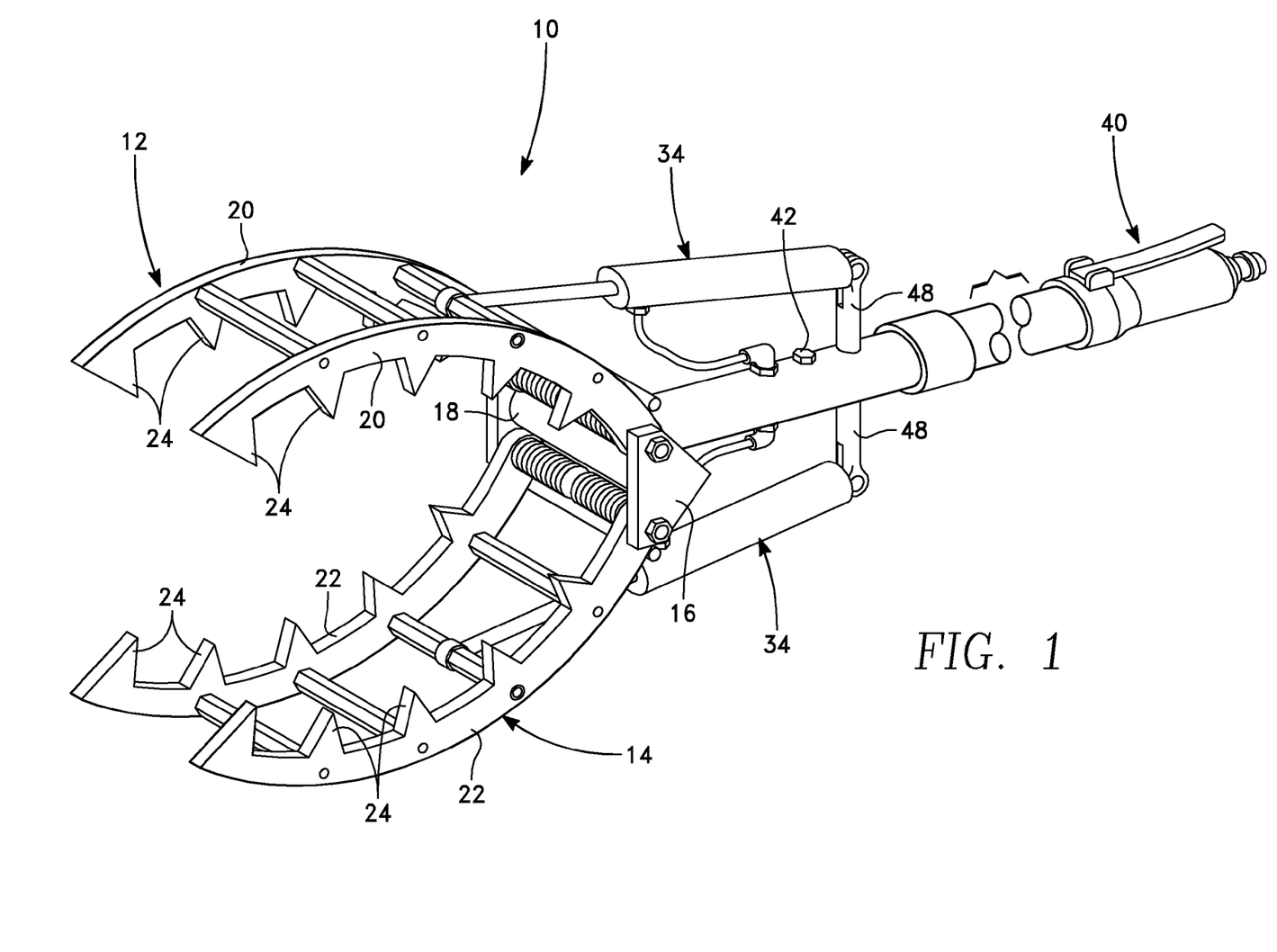
FIG. 1 is side perspective view of an embodiment of the disclosed apparatus with the opposite facing jaws in a closed position.
Figure 2:
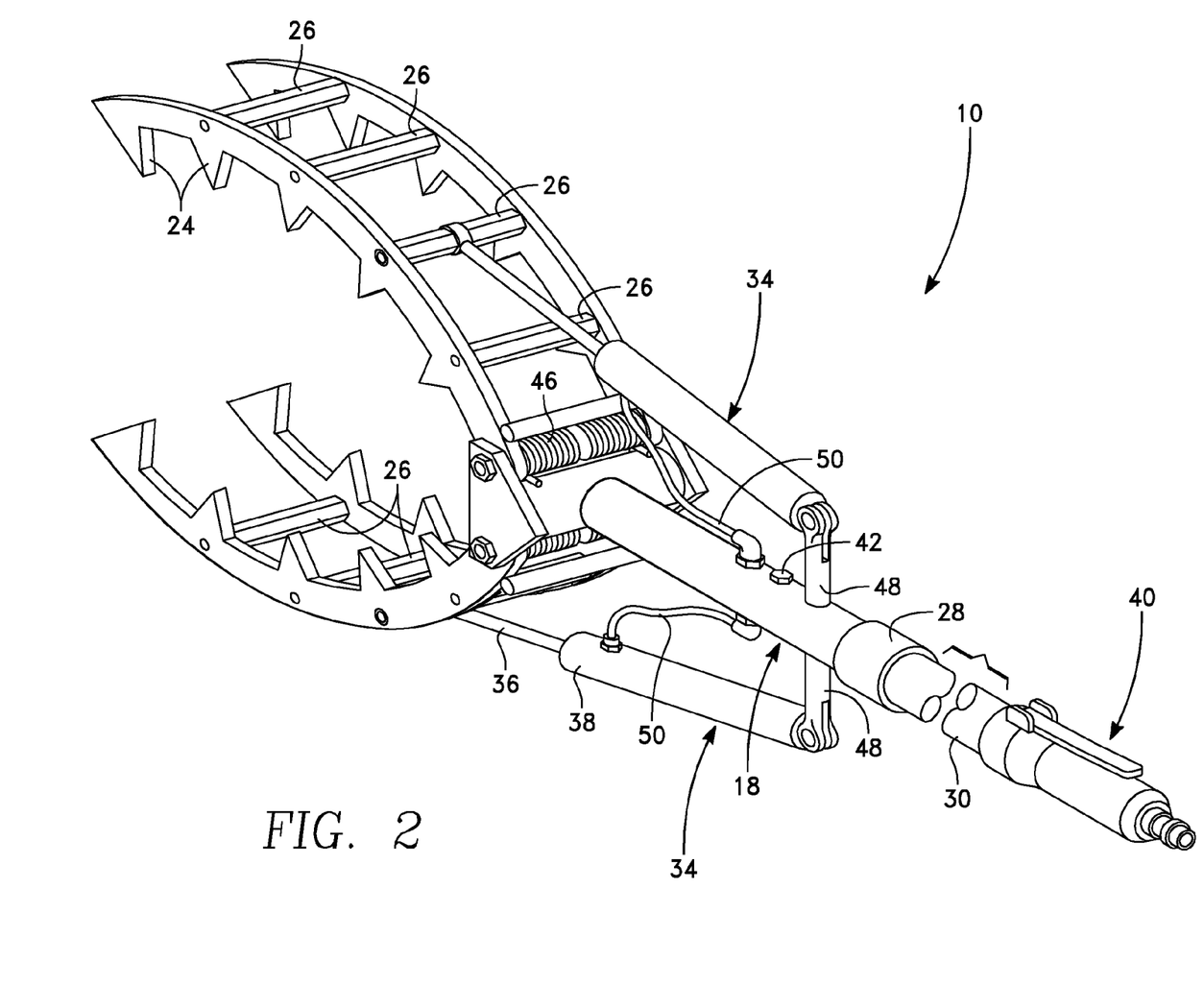
FIG. 2 is a second perspective view of an embodiment of the disclosed apparatus.
Figure 3:
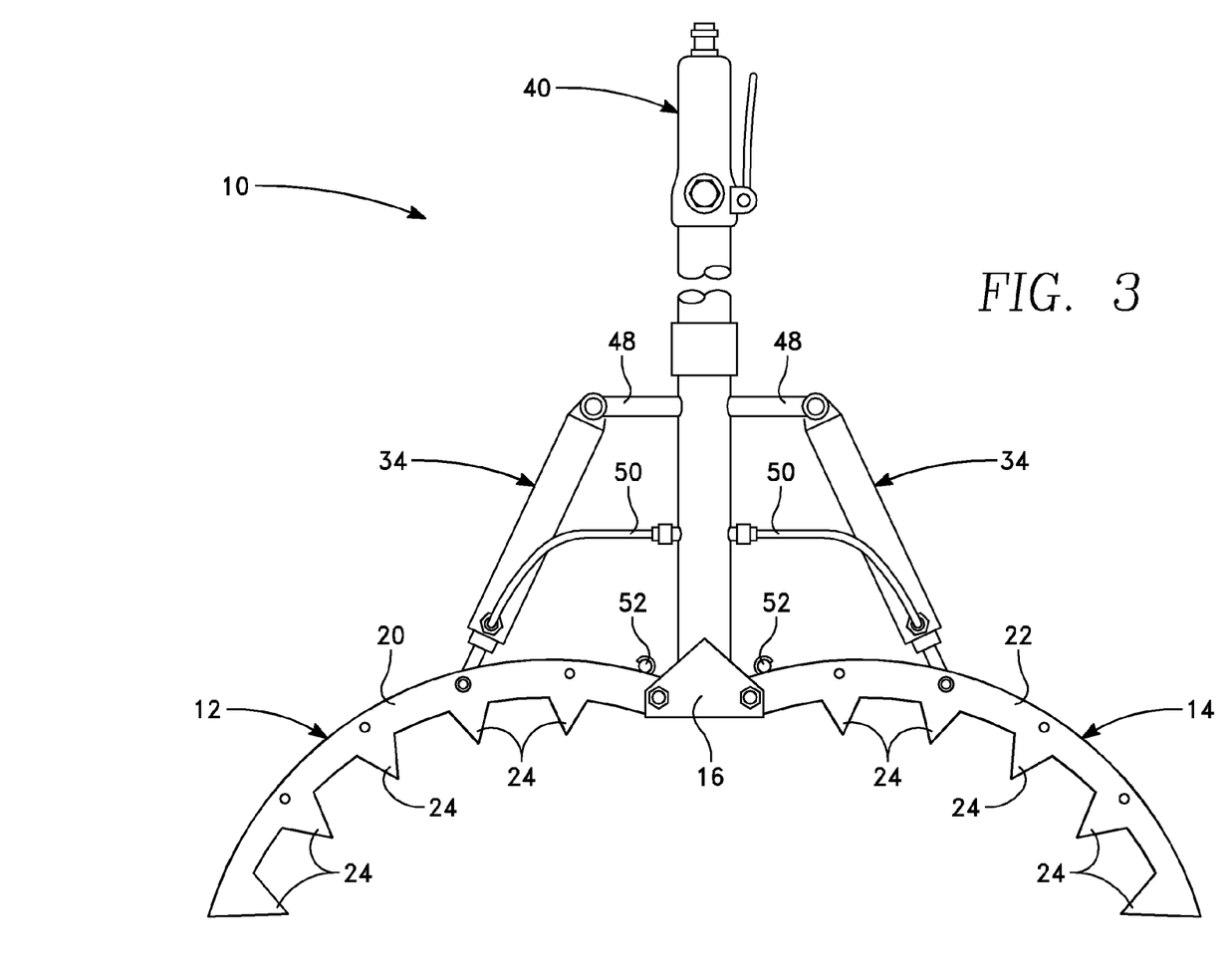
FIG. 3 shows a front view of an embodiment of the disclosed apparatus with the opposite facing jaws in an open position.
Figure 4:
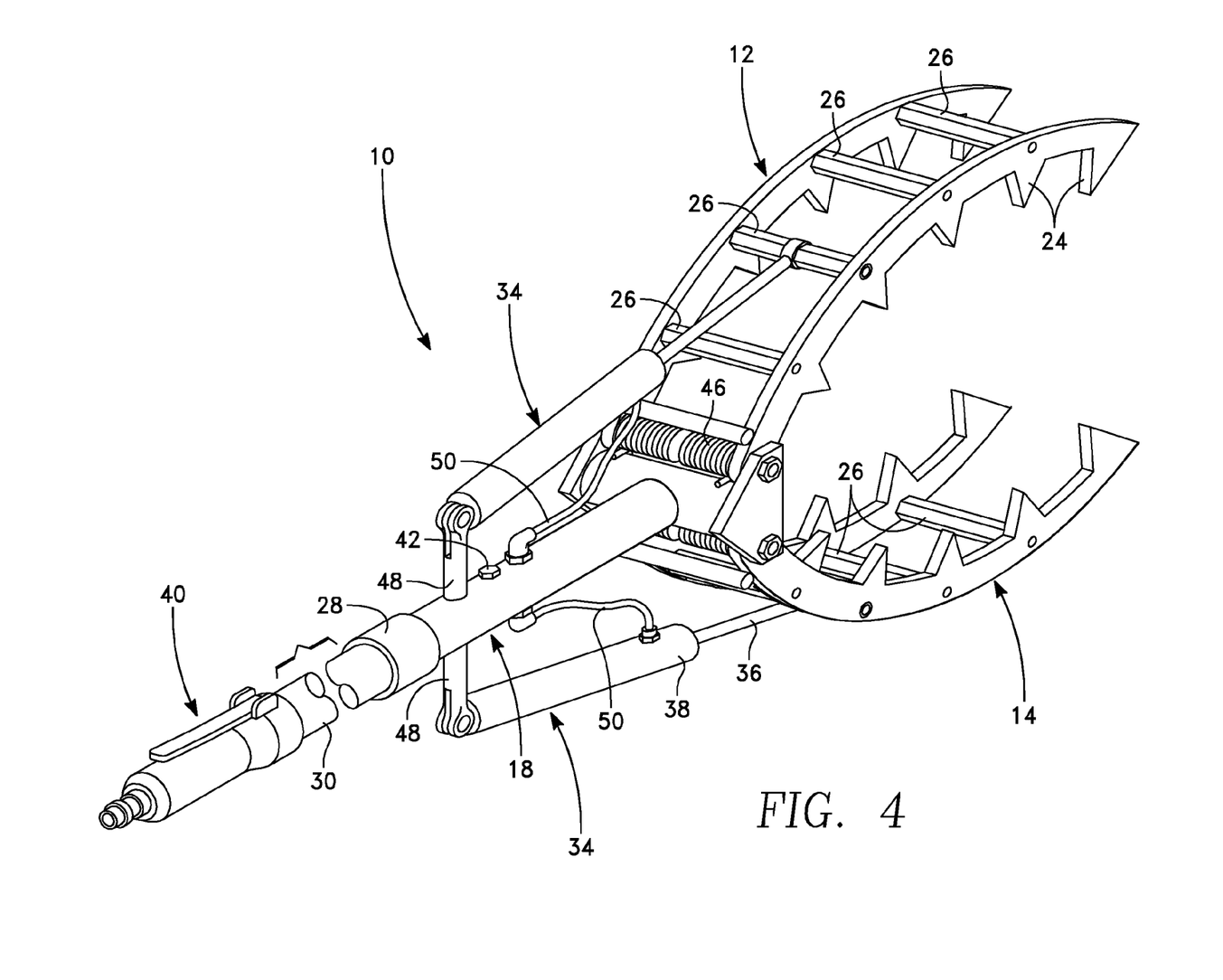
FIG. 4 is side perspective view of an embodiment of the disclosed apparatus.
Figure 5:
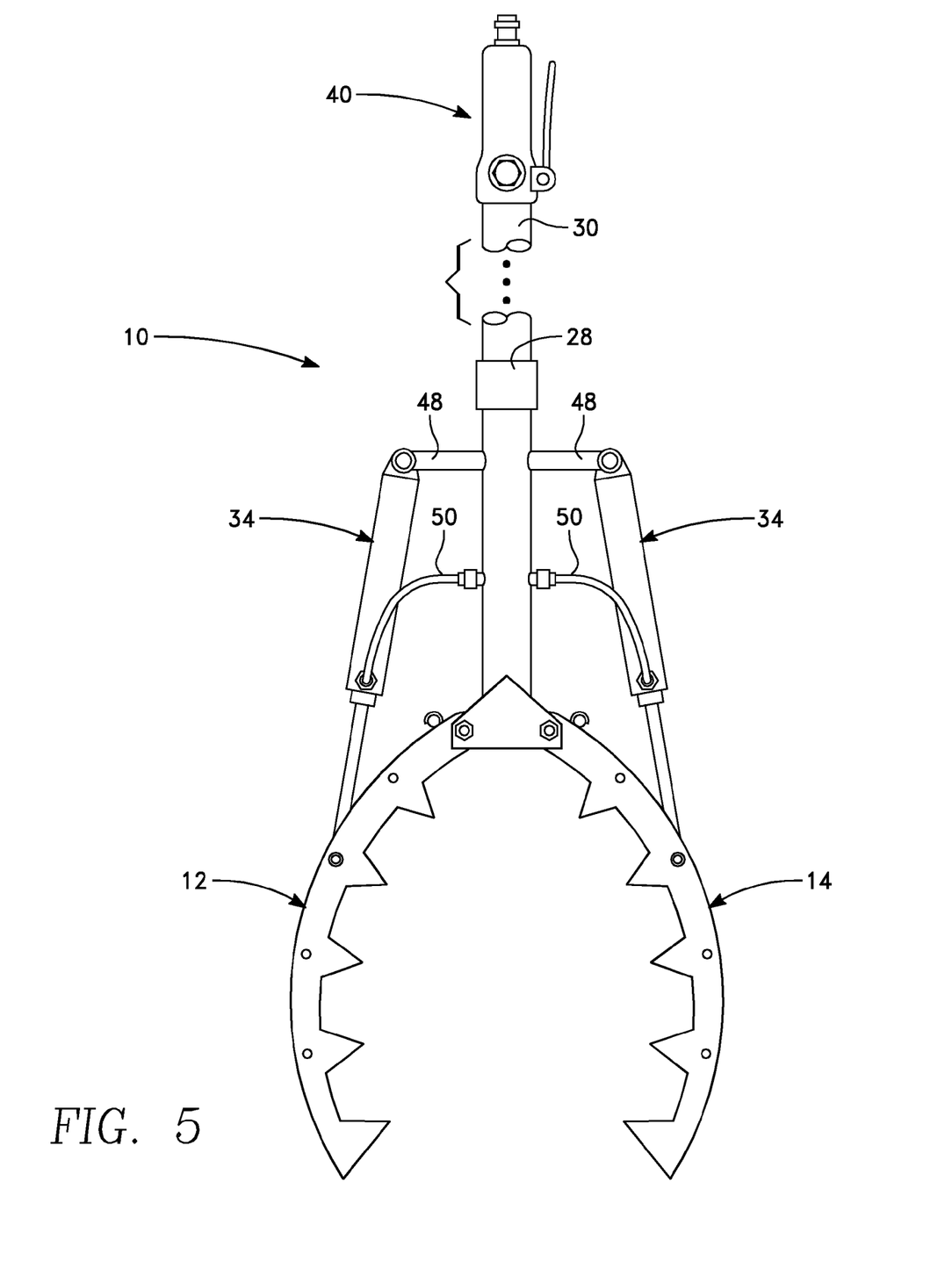
FIG. 5 is a front view of an embodiment of the disclosed apparatus.
Figure 6:
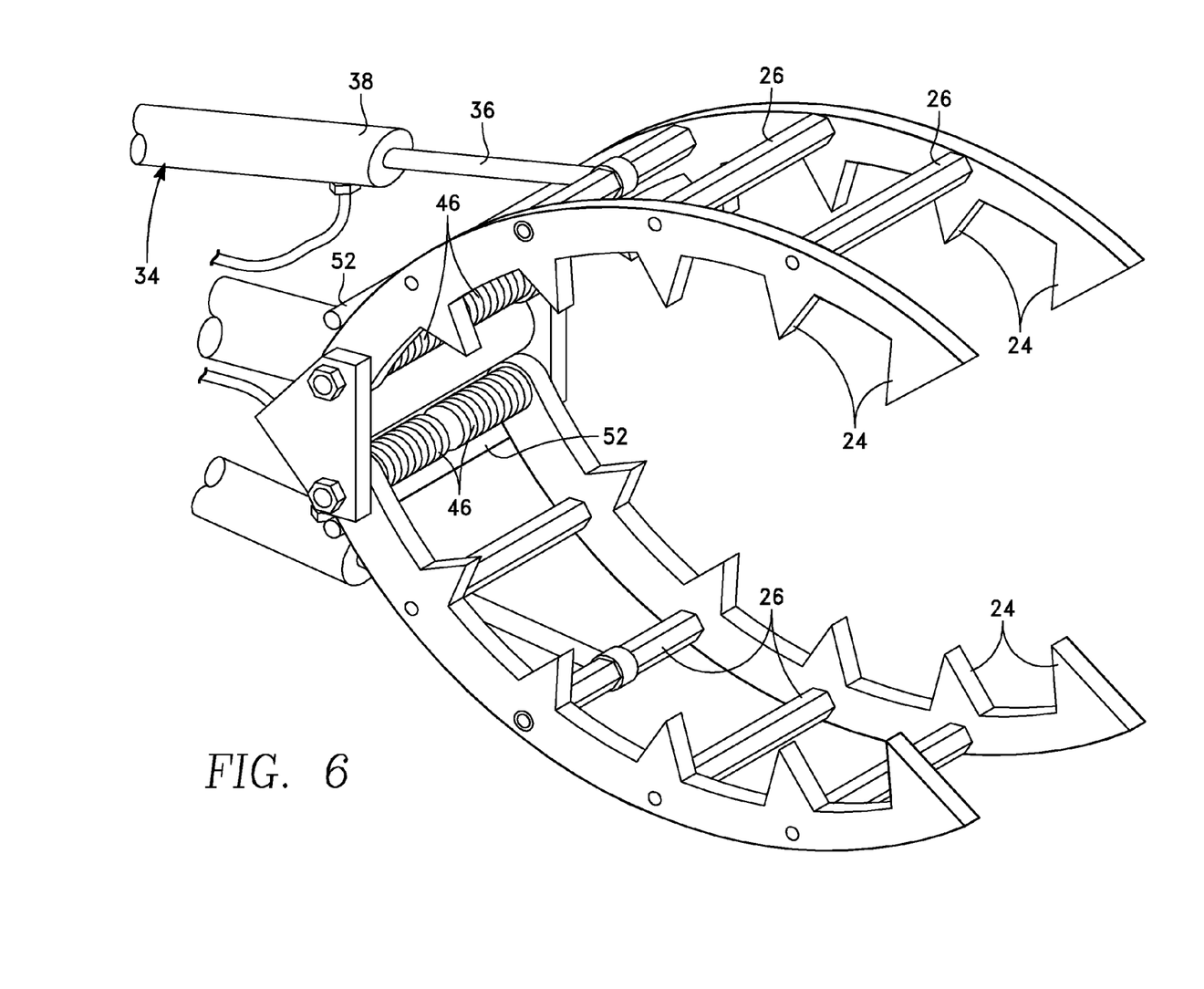
FIG. 6 is a perspective view of an embodiment of the opposite facing jaws of the disclosed apparatus.
Figure 7:
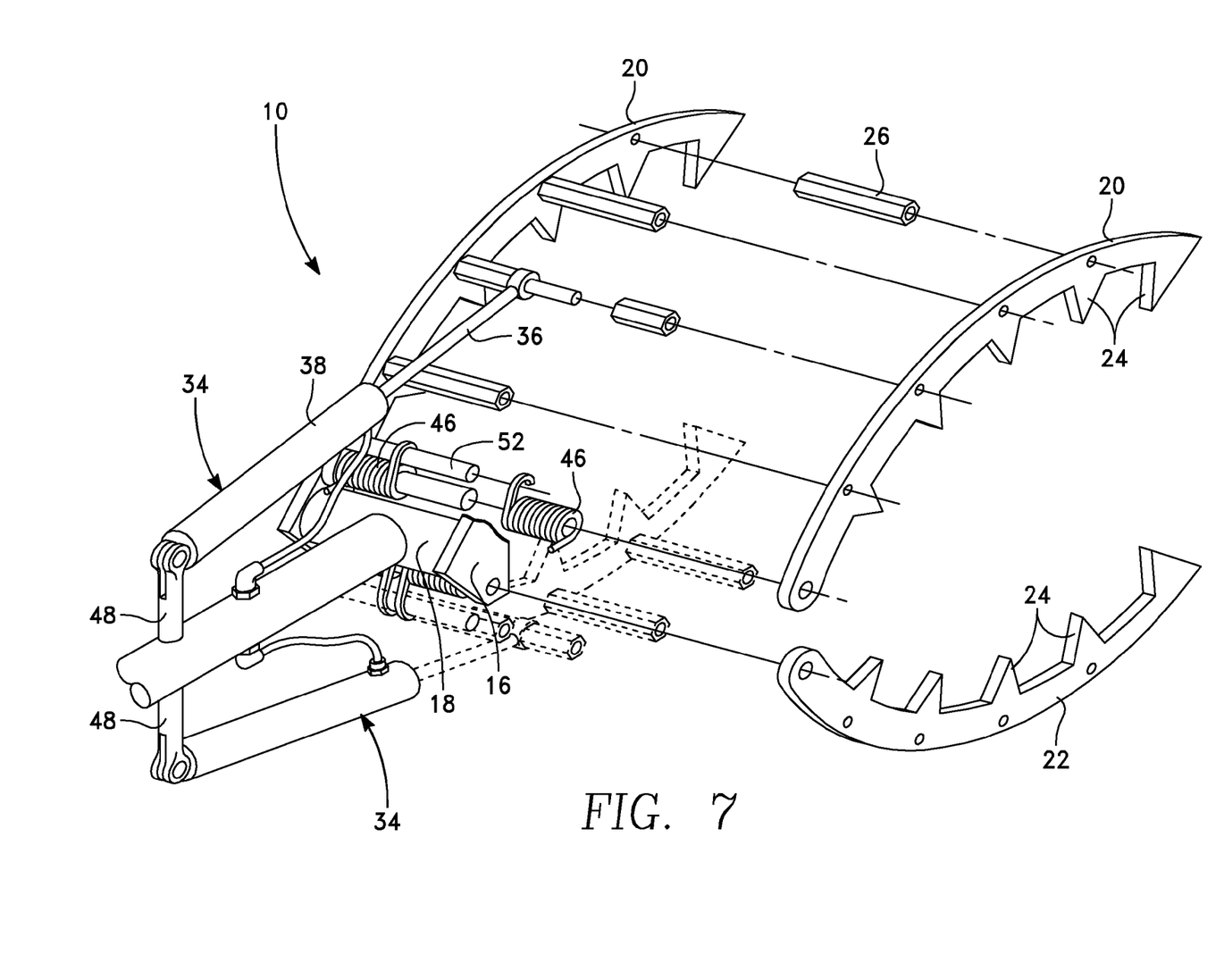
FIG. 7 is an exploded view of an embodiment of the opposite facing jaws of the disclosed apparatus.
Figure 8:
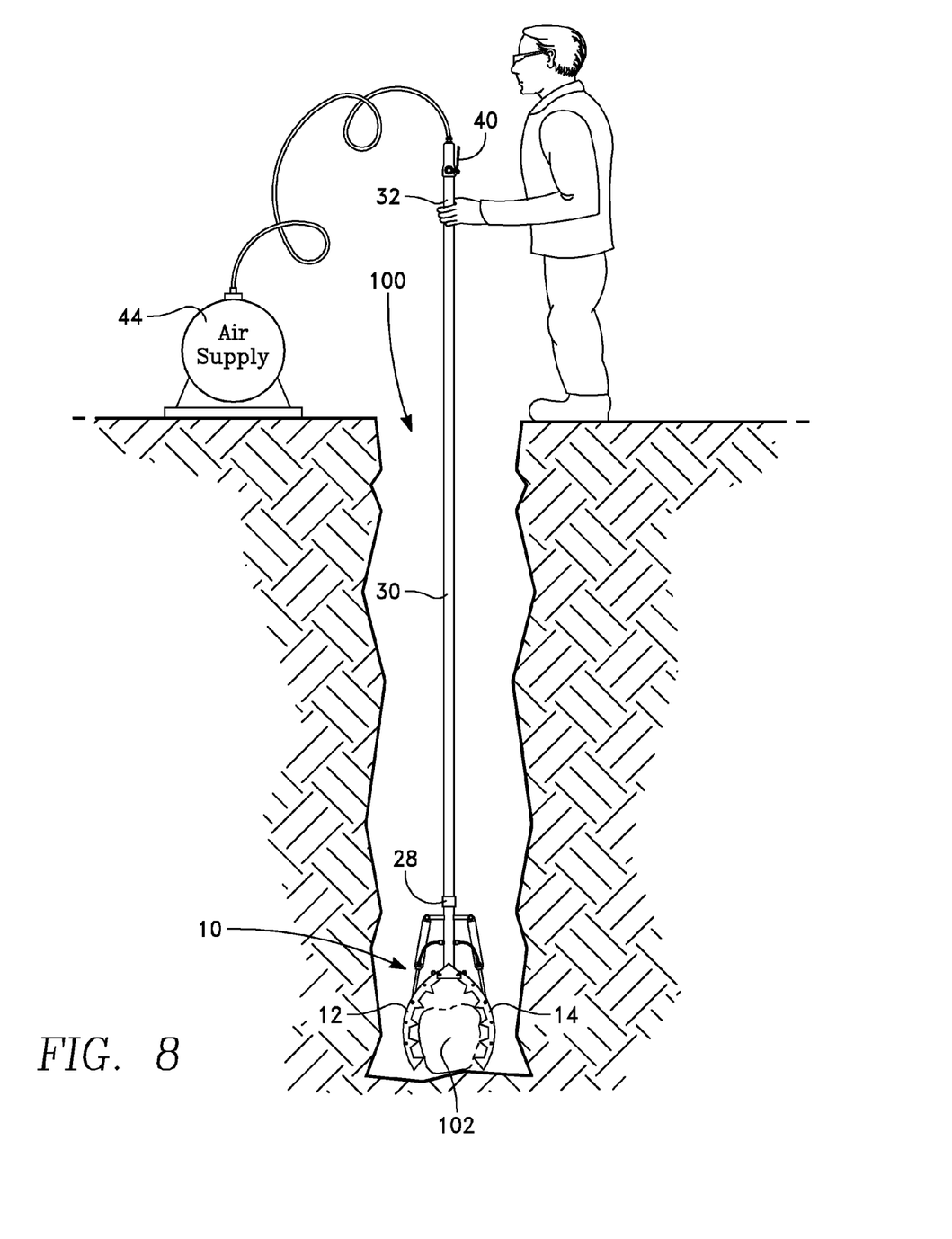
FIG. 8 shows an embodiment of the apparatus being manually lowered to retrieve an object in a generally vertical excavation

The inventor herein has found that pneumatic rams function particularly well as rams 34 for the apparatus 10. The pneumatic rams 34 receive air (or other suitable operational gas, all collectively referred to herein as "air") when an air valve 40 is opened by the user. Air is exhausted from the rams 34 when the air valve 40 is closed. The air is exhausted from the rams 34 through integral exhaust ports and air is exhausted from the frame member 18 and handle member 30 through exhaust port 42. The handle member 30 may comprise an air conduit for operation of the rams 34. The air conduit may be an independent line running in parallel with the handle member 30 or, as shown in FIG. 8, be integral to the handle member, where the handle itself is the conduit. As further shown in FIG. 8, an air supply means, such as compressor 44 is connected to the air conduit, in this case handle member 30, where the air valve 40 is disposed between the air supply means and the air conduit. Air from the handle member 30 may be delivered to each of the rams 34 through lines 50. The rams 34 may be configured such that pressurization of the rams 34 by opening air valve 40 causes retraction of the piston 36 into cylinder 38, which manipulates jaw members 12, 14 into an open position as depicted in FIG. 3. Release of pressure by closing air valve 40 causes piston 36 to extend from cylinder 38, allowing jaw members 12, 14 to move into a closed position. It is to be appreciated that, alternatively, the rams 34 may be configured to manipulate the jaw members 12, 14 into the closed position by pressurization of the rams, and into the open position by release of the pressure. In this configuration, the rams 34 would be of the type where the piston 36 would extend from the cylinder 38 upon pressurization of the ram.

FIG. 3 depicts the apparatus 10 in an open position, while the other figures depict the apparatus in a closed position. In one embodiment, the apparatus 10 is biased in the closed position by biasing means, such as helical torsion springs 46, with the springs retained by spring pins 52, where the spring pins prevent the springs from rotating thus allowing the springs to be placed in torsion by the opening of the jaw members 12, 14. Alternatively, the springs may be placed in torsion by the closing of the jaw members 12, 14. In an embodiment of the device which is sized for application in commonly sized vacuum excavations, the jaw members 12, 14 may open as widely apart at 22 inches and close to within approximately 7½ inches apart.

Use of the apparatus 10 is depicted in FIG. 8. The apparatus 10 is manually lowered into a generally vertical excavation 100. Once the apparatus is adjacent to the object to be retrieved, in this case a rock 102, the apparatus is placed into the open position (as depicted in FIG. 3) by pressurizing the rams 34 with a fluid, such as air in the case of pneumatic rams. Pressuring the rams 34, causes the opposite facing jaw members 12, 14 to move into the open position, allowing the apparatus 10 to be placed over and receive the rock 102. Once the rock 102 has been received by the opposite facing jaw members 12, 14, pressure is released from the rams 34 by closing the air valve 40, usually by releasing an activation lever, and allowing the air to vent through the ram exhausts and through exhaust port 42. When the pressure is released from the rams 34, the object is captured between the opposite facing jaw members 12, 14. The closing of the jaw members 12, 14 may be facilitated by the use of a biasing means, such as helical torsion springs 46. Once the rock 102 has been captured inside the jaw members, the apparatus 10 may be raised through the vertical excavation and the rock removed by moving the opposite facing jaw members 12, 14 into the open position.

The jaw members 12, 14 may be configured in such a shape and tooth configuration such that the weight of the object being retrieved acts to reinforce the closed position of the jaw members. That is, the gravitational force of the object, such as rock 102, has a resultant force which acts to force the jaw members 12, 14 together rather than apart.

While the above is a description of various embodiments of the present invention, further modifications may be employed without departing from the spirit and scope of the present invention. Thus the scope of the invention should not be limited according to these factors, but according to the following appended claims.

I claim:

1. A grasping apparatus for retrieving objects from a generally vertical excavation as the apparatus is manually lowered and raised within the vertical excavation, the grasping apparatus comprising:
    a first jaw member and a second jaw member in opposite facing relation, each jaw member depending from and pivotally attached to a pivot plate, the jaw members, upon a first manipulation of an air valve by a user, pivotable from a first position to a second position and, upon a second manipulation of the air valve by the user, pivotable from the second position to the first position;
    a frame member attached to the pivot plate;
    a first pneumatic ram operationally linked between at least one of the jaw members and the frame member, the pneumatic ram receiving air when the air valve is opened by the user and exhausting air when the air valve is closed by the user;
    a handle member attached to the frame, the handle member comprising a length of tubing having a grasping surface to be manually grasped by the user as the jaw members are lowered and raised within the vertical excavation, the handle member further comprising an air conduit providing air to the pneumatic ram when the air valve is opened; and
    an air supply operationally connected to the air conduit, wherein the air valve is disposed between the air supply and the air conduit.

2. The grasping apparatus of claim 1 wherein each of the opposite facing jaw members comprises a plurality of teeth members, the teeth members of each jaw member in general facing relationship with the teeth members of the opposite facing jaw member.

3. The grasping apparatus of claim 1 wherein the jaw members are biased in the first position.

4. The grasping apparatus of claim 3 wherein the jaw members are biased in the first position by a plurality of helical torsion springs.

5. The grasping apparatus of claim 1 wherein each jaw member comprises a pair of parallel disposed blade members.

6. The grasping apparatus of claim 5 wherein the parallel disposed blade members are attached together by a plurality of cross-support members.

7. The grasping apparatus of claim 1 wherein the first pneumatic ram is operationally linked between the first jaw member and the frame member, the grasping apparatus comprising a second pneumatic ram operationally linked between the second jaw member and the frame member.

8. The grasping apparatus of claim 1 wherein the air valve is integrally attached to the handle member.

9. A grasping apparatus for retrieving objects from a generally vertical excavation, the grasping apparatus comprising:
    a handle member comprising a length of tubing having a grasping surface to be manually grasped by a user as the grasping apparatus is lowered into the generally vertical excavation;
    a frame member having an upper end and a lower end, the upper end depending from the handle member;
    a pivot plate depending from the lower end of the frame member;
    a pair of opposite facing jaw members, each of the jaw members depending from and pivotably attached to the pivot plate wherein each of the opposite facing jaw members comprises a plurality of teeth members, the teeth members of each jaw member in general facing relationship with the teeth members of the opposite facing jaw member; and
    a pneumatic ram operationally linked between at least one of the jaw members and the frame member, wherein the operation of the pneumatic ram causes the opposite facing jaw members to open for receiving an object disposed within the vertical excavation and to close for enclosing the object allowing the retrieval of the object from the vertical excavation.

10. The grasping apparatus of claim 9 wherein the jaw members are biased in a closed position.

11. The grasping apparatus of claim 10 wherein the jaw members are biased in the closed position by a plurality of helical torsion springs.

12. The grasping apparatus of claim 9 wherein each jaw member comprises a pair of parallel disposed blade members.

13. The grasping apparatus of claim 12 wherein the parallel disposed blade members are attached together by a plurality of cross-support members.

14. The grasping apparatus of claim 9 wherein the opposite facing jaw members comprise a first jaw member and a second jaw member, and the first pneumatic ram is operationally linked between the first jaw member and the frame member, the grasping apparatus comprising a second pneumatic ram operationally linked between the second jaw member and the frame member.

15. The grasping apparatus of claim 9 wherein the first pneumatic ram receives air through an air valve integrally attached to the handle member.

\* \* \* \* \*